US010910955B2

(12) United States Patent
Wang et al.

(10) Patent No.: US 10,910,955 B2
(45) Date of Patent: Feb. 2, 2021

(54) SINGLE CARRIER BASED MULTILEVEL MODULATION METHOD AND DEVICE, AND STORAGE MEDIUM

(71) Applicant: Tsinghua University, Beijing (CN)

(72) Inventors: Kui Wang, Beijing (CN); Zedong Zheng, Beijing (CN); Yongdong Li, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 16/653,240

(22) Filed: Oct. 15, 2019

(65) Prior Publication Data

US 2020/0235676 A1 Jul. 23, 2020

(30) Foreign Application Priority Data

Jan. 18, 2019 (CN) .......................... 2019 1 0047031
Mar. 21, 2019 (CN) .......................... 2019 1 0217040

(51) Int. Cl.
*H02M 7/48* (2007.01)
*H02M 7/487* (2007.01)
*H02M 7/5395* (2006.01)
*H02M 7/5387* (2007.01)
*H02M 1/08* (2006.01)

(52) U.S. Cl.
CPC ............. *H02M 7/487* (2013.01); *H02M 1/08* (2013.01); *H02M 7/5387* (2013.01)

(58) Field of Classification Search
CPC ...... H02M 7/48; H02M 7/487; H02M 7/5395; H02M 7/53871
See application file for complete search history.

(56) References Cited

U.S. PATENT DOCUMENTS

| 5,321,599 A | * | 6/1994 | Tanamachi | ............ H02M 7/487 363/41 |
| 5,627,742 A | * | 5/1997 | Nakata | ...................... B60L 9/22 363/98 |
| 7,808,125 B1 | * | 10/2010 | Sachdeva | ................ H02M 7/49 307/30 |
| 10,263,535 B2 | * | 4/2019 | Wang | .................. H02M 7/5395 |
| 10,511,235 B1 | * | 12/2019 | Lin | ..................... H02M 7/5387 |
| 2010/0110743 A1 | * | 5/2010 | Yamasaki | ........... H02M 7/5395 363/132 |
| 2015/0357938 A1 | * | 12/2015 | Yamasaki | ............... H02P 27/00 363/41 |
| 2016/0056714 A1 | * | 2/2016 | Ek | ......................... H04W 88/02 323/271 |
| 2017/0222574 A1 | * | 8/2017 | Lewis | ................... H02M 7/487 |
| 2018/0219469 A1 | * | 8/2018 | Yamashita | .............. H02P 27/08 |
| 2019/0068080 A1 | * | 2/2019 | Wang | ................. H02M 7/5395 |
| 2019/0190403 A1 | * | 6/2019 | Furukawa | ............... H02M 1/08 |

* cited by examiner

*Primary Examiner* — Thienvu V Tran
*Assistant Examiner* — Sisay G Tiku
(74) *Attorney, Agent, or Firm* — Hodgson Russ LLP (57) ABSTRACT

The present disclosure provides a single carrier based multilevel modulation method, a single carrier based multilevel modulation device, and a storage medium. In each control period, a modulated wave value corresponding to each of n switch pairs is obtained according to a reference voltage to obtain n modulated wave values, a triangular carrier having an amplitude of n is generated and compared with each of the n modulated wave values to obtain control signals for each of the n switch pairs, and for each phase, the control signals are input to the corresponding switch pairs of the phase bridge.

12 Claims, 9 Drawing Sheets

SINGLE CARRIER BASED MULTILEVEL MODULATION METHOD AND DEVICE, AND STORAGE MEDIUM

CROSS-REFERENCE TO RELATED APPLICATIONS

This application claims priority to Chinese Patent Application No. 201910217040.4, filed Mar. 21, 2019, and to Chinese Patent Application No. 201910047031.5, filed Jan. 18, 2019, the entire disclosures of which are incorporated herein by reference.

TECHNICAL FIELD

The present disclosure generally relates to the field of multilevel converter technology, and more particularly, to a single carrier based multilevel modulation method, a single carrier based multilevel modulation device, and a storage medium

BACKGROUND

Neutral point clamped (NPC) multilevel inverter is a classic topology that is widely used in industry. As the power and voltage of motors and inverters increase by year, more attentions are paid on the multilevel topologies with more than three voltage levels. However, for NPC multilevel inverter, it suffers from the severe DC-link voltage unbalance problem when the voltage level increases to four or five, which blocks its application in higher voltage occasions.

SUMMARY

Embodiments of a first aspect of the present disclosure provide a single carrier based multilevel modulation method. In each control period, a modulated wave value corresponding to each of n switch pairs is obtained according to a reference voltage to obtain n modulated wave values, a triangular carrier having an amplitude of n is generated and compared with each of the n modulated wave values to obtain control signals for each of the n switch pairs, the control signals include a first control signal and a second control signal, and the first control signal and the second control signal are complementary, and the first control signal and the second control signal are input to the corresponding switch pairs of the phase bridge.

Embodiments of a second aspect of the present disclosure provide a single carrier based multilevel modulation device. The device includes one or more processors, and a storage device configured to store one or more programs. When the one or more programs are executed by the one or more processors, the one or more processors are caused to: in each control period, obtain a modulated wave value corresponding to each of n switch pairs according to a reference voltage to obtain n modulated wave values, in which each of the n switch pairs includes a first switch and a second switch, the first switch and the second switch are complementary, n is a positive integer; generate a triangular carrier having an amplitude of n, and compare the triangular carrier with each of the n modulated wave values to obtain control signals for each of the n switch pairs, in which the control signals includes a first control signal and a second control signal, and the first control signal and the second control signal are complementary; and for each phase, input the first control signal to the first switch of a phase bridge, and input the second control signal to the second switch of the phase bridge, the phase bridge include n switch pairs.

Embodiments of a third aspect of the present disclosure provide a non-transitory computer storage medium having stored thereon a computer program that, when executed by a processor, causes a single carrier based multilevel modulation method according to any embodiment of the present disclosure to be implemented.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Reference will now be made in detail to exemplary embodiments, examples of which are illustrated in the accompanying drawings. The same or similar elements and elements having same or similar functions are denoted by like reference numerals throughout the descriptions. The embodiments described herein with reference to the accompanying drawings are explanatory and used to generally understand the present disclosure, which is not construed to limit the embodiments of the present disclosure.

Figure 1:
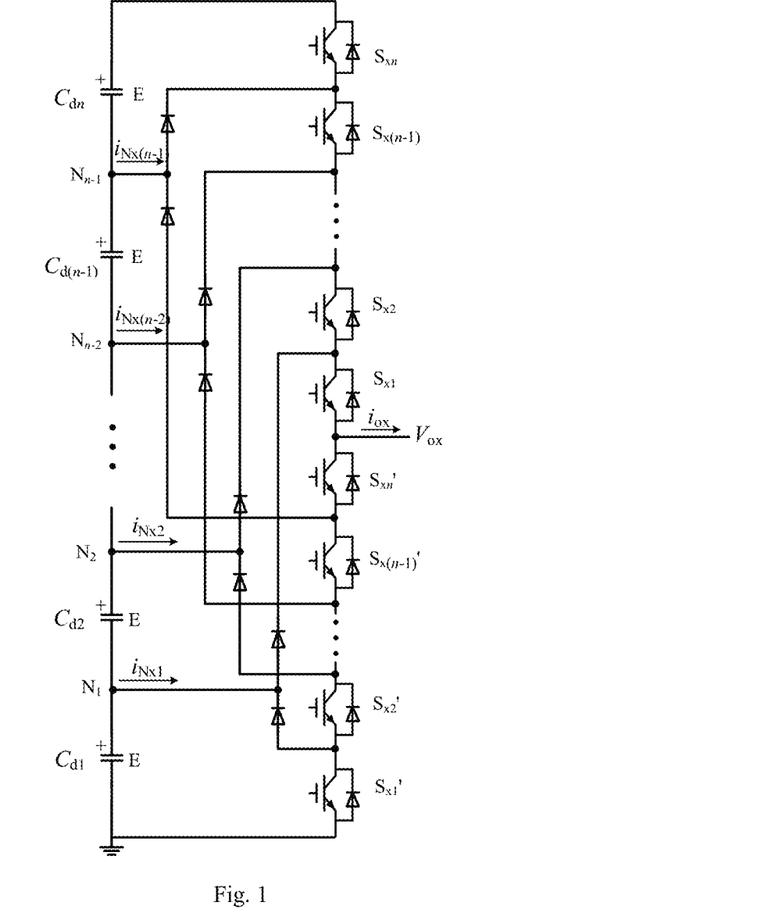
FIG. 1 is a schematic diagram of a phase bridge of a diode-clamped multilevel converter according to an embodiment of the present disclosure.
Figure 2:
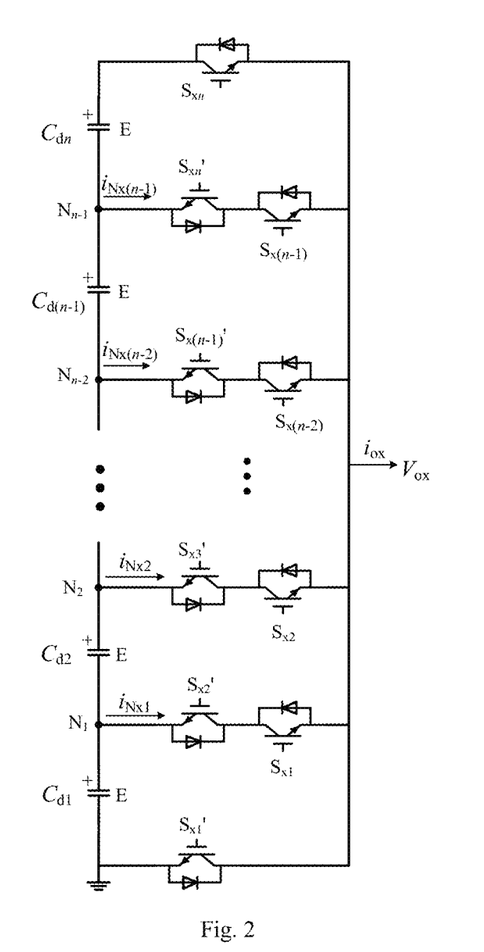
FIG. 2 is a schematic diagram of a phase bridge of a T-type NPC multilevel converter according to an embodiment of the present disclosure.
Figure 3:
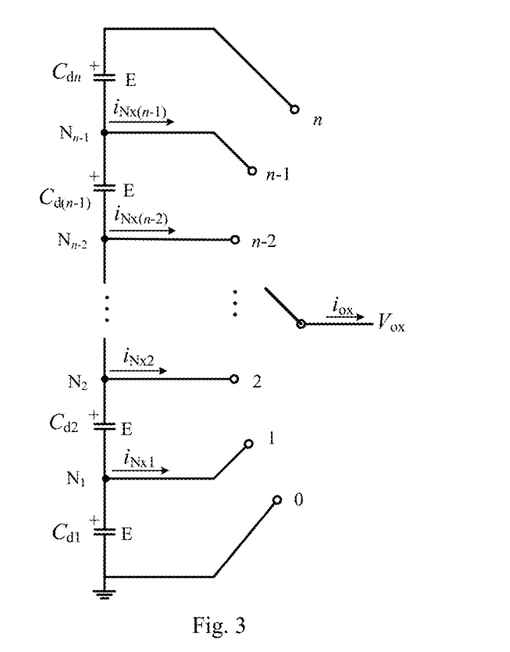
FIG. 3 is a schematic diagram of an equivalent circuit of a NPC multilevel converter according to an embodiment of the present disclosure.

NPC multilevel converters include many different types of topologies, such as diode-clamped, T-type NPC, all of them can be equivalent to a single-pole multi-throw switch. FIG. 1 is a schematic diagram of a phase bridge of a diode-clamped multilevel converter according to an embodiment of the present disclosure. FIG. 2 is a schematic diagram of a phase bridge of a T-type NPC multilevel converter according to an embodiment of the present disclosure. FIG. 3 is a schematic diagram of an equivalent circuit of a NPC multilevel converter according to an embodiment of the present disclosure.

Figure 4:
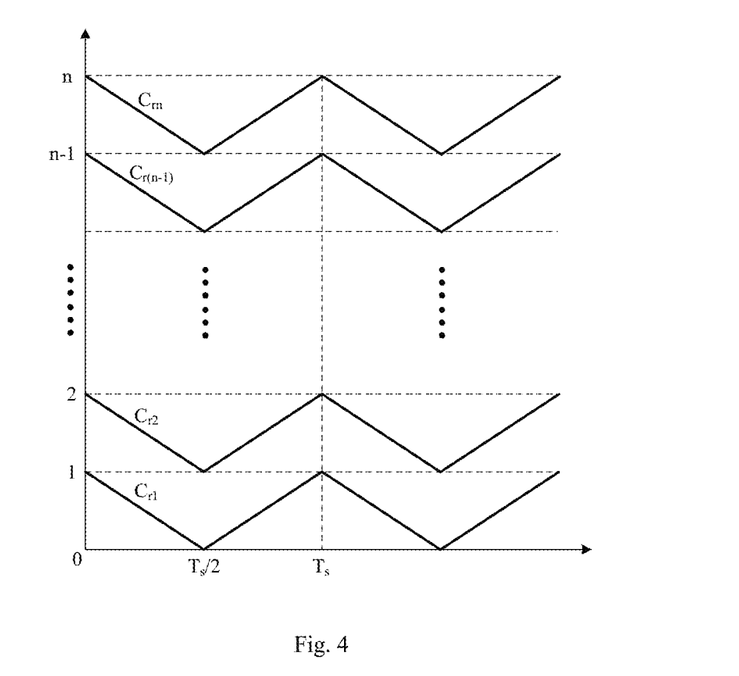
FIG. 4 is a schematic diagram of existing phase-disposition pulse width modulation (PDPWM) according to an embodiment of the present disclosure.

In the related art, the method for achieving voltage balance may include phase-disposition PWM (PDPWM) and space vector PWM. FIG. 4 is a schematic diagram of existing PDPWM according to an embodiment of the present disclosure. As shown in FIG. 4, n triangular carriers are adopted, and each of the n triangular carriers is compared with a modulated wave to generate n switching signals. However, PDPWM cannot achieve capacitor voltage balance under full modulation index and load power factor range. For space vector PWM, redundant vectors may increase with the increase of the voltage levels, and in order to achieve capacitor voltage balance, it is usually required to synthesize a virtual vector by multiple redundant vectors, the control algorithm is complex, and the calculation is heavy.

Figure 5:
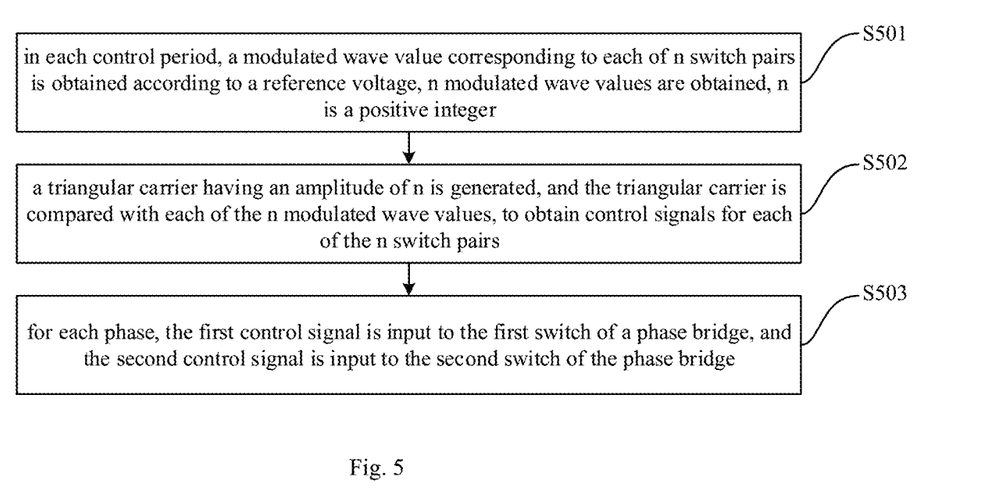
FIG. 5 is a flow chart of a single carrier based multilevel modulation method according to an embodiment of the present disclosure.

Embodiments of the present disclosure provide a single carrier based multilevel modulation method and device. FIG. 5 is a flow chart of a single carrier based multilevel modulation method according to an embodiment of the present disclosure. As shown in FIG. 5, the method may include the followings.

At block S501, in each control period, a modulated wave value corresponding to each of n switch pairs is obtained according to a reference voltage, and n modulated wave values are obtained.

In an embodiment, the modulated wave value corresponding to each of n switch pairs can be obtained based on the reference voltage $u_{refx}$, each of the n switch pairs includes a first switch and a second switch, the first switch and the second switch are complementary, n is a positive integer. The $k^{th}$ modulated wave value $u_{refxk}$ for the $k^{th}$ switch pair $S_{xk}$ and $S_{xk}'$ can be denoted as:

$$\text{when } 0 \leq u_{refx} \leq n/2, u_{refxk} = \frac{2(n-k)}{n-1}u_{refx};$$

$$\text{when } n/2 \leq u_{refx} \leq n, u_{refxk} = n - \frac{2(k-1)}{n-1}(n - u_{refx});$$

where k denotes a switch serial number, and is a positive integer, $1 \leq k \leq n$.

At block S502, a triangular carrier having an amplitude of n is generated, and the triangular carrier is compared with each of the n modulated wave values, to obtain control signals for each of the n switch pairs.

In an embodiment, the triangular carrier having the amplitude of n can be generated and compared with each of the n modulated wave values. The control signals may include a first control signal and a second control signal, and the first control signal and the second control signal are complementary.

In an embodiment, when the modulated wave value is greater than the triangular carrier, the first control signal corresponding to the first switch is a high level, and the second control signal corresponding to the second switch is a low level. When the modulated wave value is less than or equal to the triangular carrier, the first control signal corresponding to the first switch is a low level, and the second control signal corresponding to the second switch is a high level.

At block S503, for each phase, the first control signal is input to the first switch of a phase bridge, and the second control signal is input to the second switch of a phase bridge.

In an embodiment, for the NPC multilevel converter with n capacitors connected in series for direct current link (DC-link), it is assumed that the nominal voltage of each of then capacitors is E, a voltage of a capacitor is selected as a base voltage value, and the negative pole of the DC-link is referred as the zero potential, and n+1 voltage levels can be output. Each phase bridge includes n switch pairs, and each switch pair includes a first switch and a second switch, such as $S_{x1}$ and $S_{x1}'$, $S_{x2}$ and $S_{x2}'$, . . . and $S_{xn}$ and $S_{xn}'$ shown in FIG. 1 and FIG. 2, and $S_{x1}$ and $S_{x1}'$ are complementary, $S_{x2}$ and $S_{x2}'$ are complementary, . . . , $S_{xn}$ and $S_{xn}'$ are complementary. As the output level increases, $S_{x1}$, $S_{x2}$, . . . , and $S_{xn}$ may be sequentially turned on in order.

Figure 6:
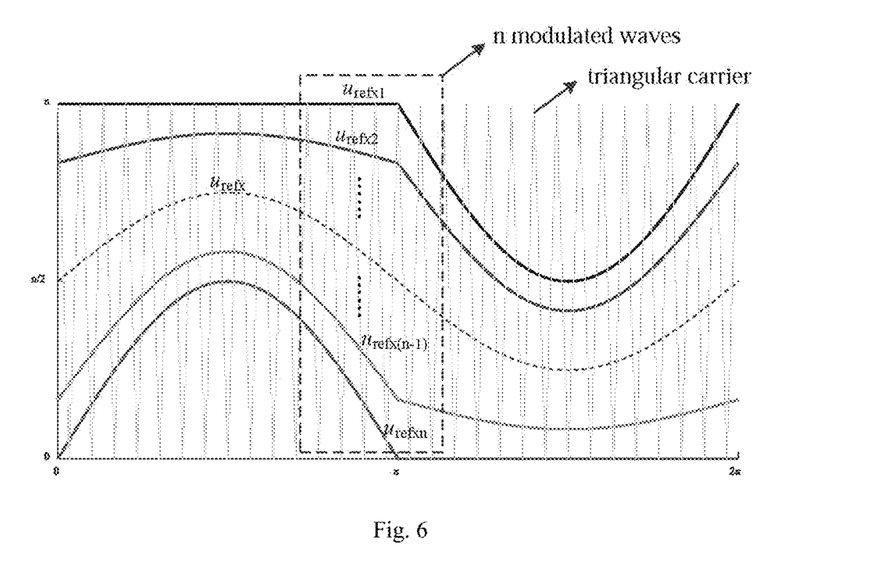
FIG. 6 is a schematic diagram illustrating single carrier based multilevel modulation according to an embodiment of the present disclosure.

It is assumed the reference voltage $u_{refx}$ (the subscript symbol x represents phase a, b or c) of each phase bridge ranges from 0 to n, i.e., $0 \leq u_{refx} \leq n$. A triangular carrier with the value ranging from 0 to n may be generated, and each of n different modulated waves may be compared with the triangular wave. FIG. 6 is a schematic diagram illustrating single carrier based multilevel modulation according to an embodiment of the present disclosure. As shown in FIG. 6, control signals for the n first switches $S_{x1}, S_{x2}, \ldots, S_{xn}$ and control signals for the n second switches $S_{x1}', S_{x2}', \ldots, S_{xn}'$ can be generated. Each switch pair corresponds to a modulated wave, for example, the modulated wave value corresponding to the $k^{th}$ switch pair $S_{xk}$ and $S_{xk}'$ may be defined as $u_{refxk}$, where k=1, 2, . . . , n. When $u_{refxk}$ is greater than the triangular carrier, the control signal corresponding to the switch $S_{xk}$ may be a high level, and the control signal corresponding to the switch $S_{xk}'$ may be a low level, and when $u_{refxk}$ is less than or equal to the triangular carrier, the control signal corresponding to the switch $S_{xk}$ may be the low level, and the control signal corresponding to the switch $S_{xk}'$ may be the high level.

The duty ratio of the control signal of the switch $S_{xk}$ in a carrier period may be denoted as:

$$d_{xk} = \frac{u_{refxk}}{n}, \quad (1)$$

When $0 \leq u_{refx} \leq n/2$, the modulated wave value $u_{refxk}$ may be denoted by:

$$u_{refxk} = \frac{2(n-k)}{n-1}u_{refx}, \quad (2)$$

and the average $u_{ox}$ of the output phase voltage in a carrier period may be calculated as:

$$u_{ox} = \sum_{k=1}^{n} d_{xk} = \sum_{k=1}^{n} \frac{2(n-k)}{n(n-1)} u_{refx} = \frac{2u_{refx}}{n(n-1)} \cdot \frac{n(n-1)}{2} = u_{refx}. \quad (3)$$

When $0 \leq u_{refx} \leq n/2$, the modulated wave value $u_{refxk}$ may be denoted by:

$$u_{refxk} = n - \frac{2(k-1)}{n-1}(n - u_{refx}), \quad (4)$$

and the average $u_{ox}$ of the output phase voltage in a carrier period may be calculated as:

$$u_{ox} = \sum_{k=1}^{n} d_{xk} = \sum_{k=1}^{n} 1 - \frac{2(k-1)}{n(n-1)}(n - u_{refx}) = u_{refx} \quad (5)$$

As can be seen from the formula (3) and (5), the average value of the output phase voltage in a carrier period equals to the reference voltage, such that the volt-second balance principle can be satisfied.

In at least one embodiment, an average of all neutral point currents is zero in a fundamental period. Specifically, the neutral point current of the DC-link may affect the capacitor voltage balance of the DC-link, when the average of all the neutral point currents is zero in a fundamental period, the capacitor voltage balance in the fundamental period can be achieved.

For the equivalent circuit shown in FIG. 3, the phase current flows the neutral point $N_j$ (j=1, 2, ..., n-1) when the output voltage level is j, the current of any neutral point may be denoted as:

$$\text{when } 0 \leq u_{refx} \leq n/2, \, i_{Nxj} = (d_{xj} - d_{x(j+1)}) i_{ox} = \frac{2u_{refx}}{n(n-1)} i_{ox};$$

$$\text{when } n/2 \leq u_{refx} \leq n, \, i_{Nxj} = (d_{xj} - d_{x(j+1)}) i_{ox} = \frac{2(n - u_{refx})}{n(n-1)} i_{ox};$$

where $i_{ox}$ denotes the output current of x phase, $i_{Nxj}$ denotes the current of the neutral point $N_j$. As can be seen from the above formula, in each carrier period, the current $i_{Nxj}$ of the neutral point $N_j$ is merely related to the reference voltage $u_{refx}$ and $i_{ox}$, not related with j, indicating that the currents of all the neutral point are equal in each carrier period.

When the output voltage and the output current are sinusoidal and symmetrical, the average of the neutral point current in a fundamental period may be calculated as follows:

$$I_{Nxj} = \frac{1}{2\pi} \int_0^{2\pi} i_{Nxj} d\theta \quad (6)$$

$$= \frac{1}{2\pi} \left[ \int_0^{\pi} \frac{2(n - u_{refx})}{n(n-1)} \cdot i_{ox} d\theta + \int_{\pi}^{2\pi} \frac{2u_{refx}}{n(n-1)} \cdot i_{ox} d\theta \right]$$

As can be seen from formula (6), the average of each neutral point current in a fundamental period is zero, regardless of the modulation index and power factor, which indicates that all the neutral point voltages can be naturally balanced in a fundamental period.

With the technical solution of the present disclosure, a triangular carrier is generated, the value of which ranges from 0 to n, and the triangular carrier is compared with each of the n different modulated waves, such that control signals for n switches $S_{x1}$, $S_{x2}$, ..., and $S_{xn}$ can be obtained. By setting a linear transformation function, the modulated wave value $u_{refxk}$ corresponding to the switch pair $S_{xk}$ and $S_{xk}'$ can be obtained, where k=1, 2, ..., n. By analyzing the neutral point current corresponding to the modulated wave, it can be inferred that the average of all neutral point currents is zero in a fundamental period. Thereby, the method of the embodiment of the present disclosure is simple and easy to implement, and can achieve the capacitor voltage balance under the full modulation indexes and load power factors of the NPC multilevel converter.

The single carrier based multilevel modulation method of the present disclosure will further be described below.

Figure 7:
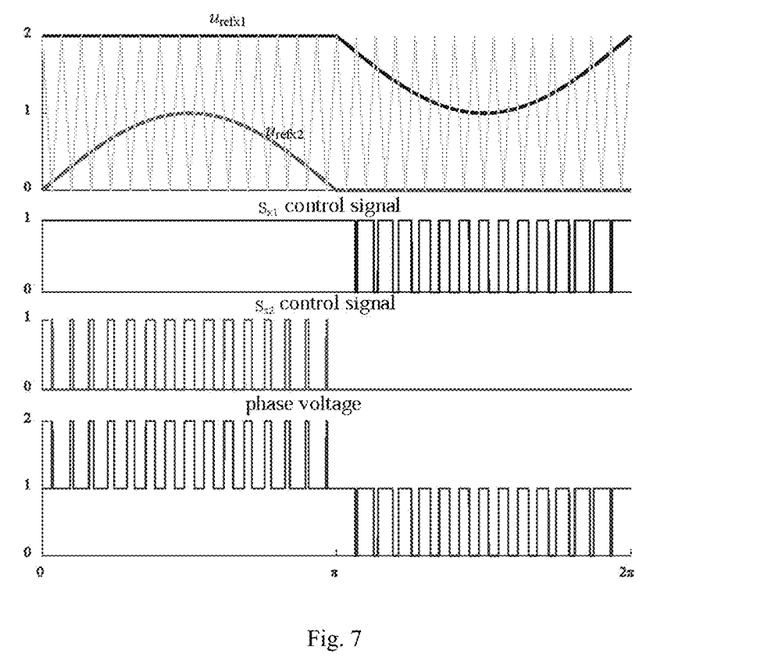
FIG. 7 is a schematic diagram illustrating single carrier based three-level modulation according to an embodiment of the present disclosure.

For NPC three-level converters, n=2, by substituting 2 into formulas (2) and (4), it can be obtained that:

$$u_{refx1} = \begin{cases} 2u_{refx}, & 0 \leq u_{refx} \leq 1 \\ 2, & 1 \leq u_{refx} \leq 2 \end{cases} \quad (7)$$

$$u_{refx2} = \begin{cases} 0, & 0 \leq u_{refx} \leq 1 \\ 2u_{refx} - 2, & 1 \leq u_{refx} \leq 2 \end{cases}$$

When $u_{refx}$ is a symmetric and sinusoidal waveform, based on the formula (7), the reference voltages, the control signal of each switch and the output phase voltage may be drawn, as shown in FIG. 7. FIG. 7 is a schematic diagram illustrating single carrier based three-level modulation according to an embodiment of the present disclosure, as can be seen from FIG. 7, the modulation strategy in the embodiment is equivalent to the three-level PDPWM in the related art, and similar modulation effects can be achieved.

Figure 8:
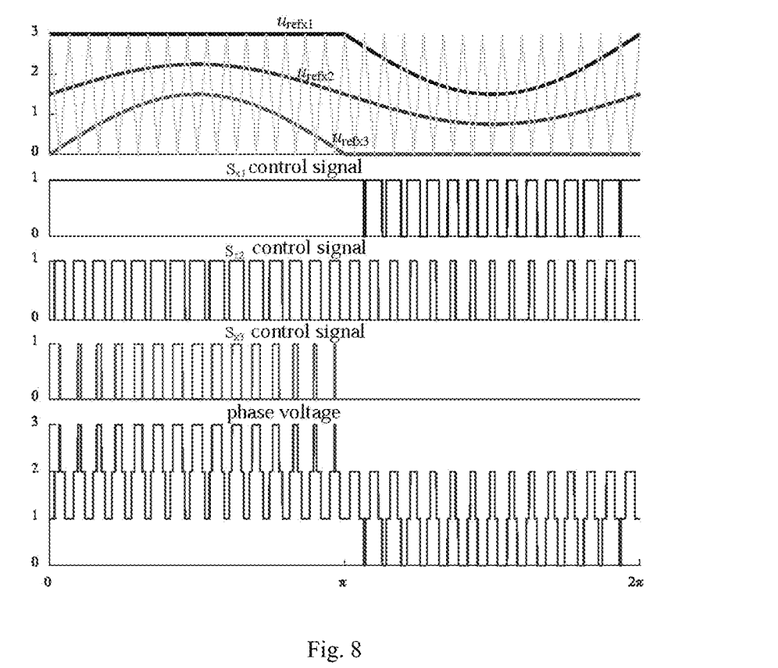
FIG. 8 is a schematic diagram illustrating single carrier based four-level modulation according to an embodiment of the present disclosure.

For NPC four-level converters, n=3, by substituting 3 into formulas (2) and (4), it can be obtained that:

$$u_{refx1} = \begin{cases} 2u_{refx}, & 0 \leq u_{refx} \leq 1.5 \\ 3, & 1.5 \leq u_{refx} \leq 3 \end{cases} \quad (8)$$

$$u_{refx2} = \begin{cases} u_{refx}, & 0 \leq u_{refx} \leq 1.5 \\ u_{refx}, & 1.5 \leq u_{refx} \leq 3 \end{cases}$$

$$u_{refx3} = \begin{cases} 0, & 0 \leq u_{refx} \leq 1.5 \\ 2u_{refx} - 3, & 1.5 \leq u_{refx} \leq 3 \end{cases}$$

When $u_{refx}$ is a symmetric and sinusoidal waveform, based on the formula (8), the reference voltages, the control signal of each switch and the output phase voltage may be drawn, as shown in FIG. 8. FIG. 8 is a schematic diagram illustrating single carrier based four-level modulation according to an embodiment of the present disclosure, as can be seen from FIG. 8, the output phase voltage waveform has four levels.

Figure 9:
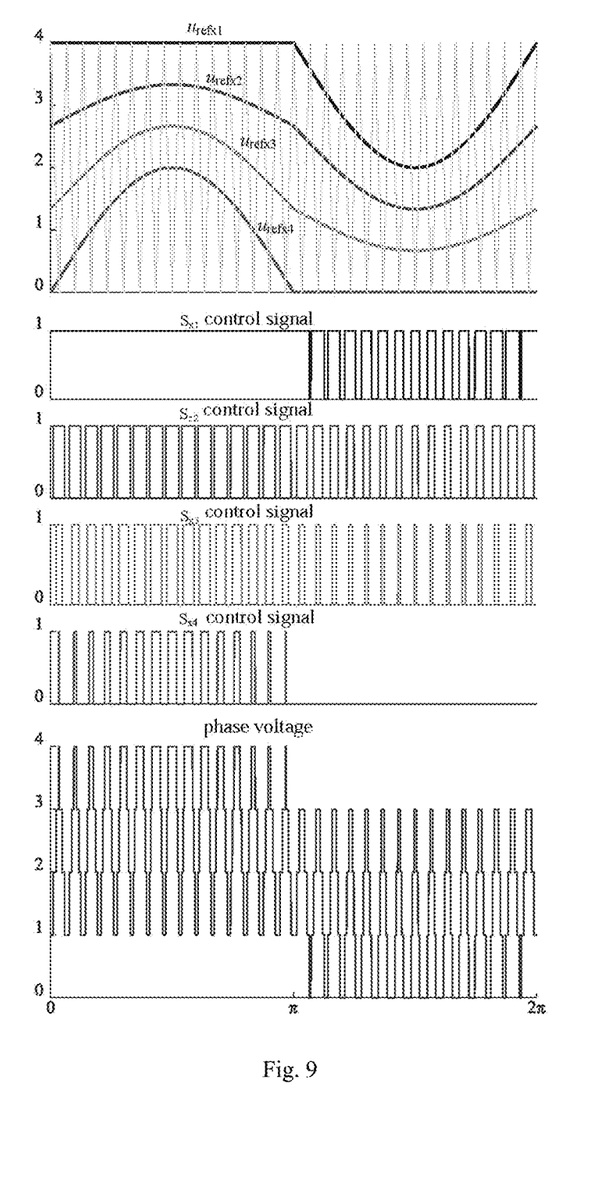
FIG. 9 is a schematic diagram illustrating single carrier based five-level modulation according to an embodiment of the present disclosure.

For NPC five-level converters, n=4, by substituting 4 into formulas (2) and (4), it can be obtained that:

$$u_{refx1} = \begin{cases} 2u_{refx}, & 0 \leq u_{refx} \leq 2 \\ 4, & 2 \leq u_{refx} \leq 4 \end{cases} \quad (9)$$

-continued $$u_{refx2} = \begin{cases} \frac{4}{3}u_{refx}, & 0 \le u_{refx} \le 2 \\ \frac{2}{3}(u_{refx} + 2), & 2 \le u_{refx} \le 4 \end{cases}$$

$$u_{refx3} = \begin{cases} \frac{2}{3}u_{refx}, & 0 \le u_{refx} \le 2 \\ \frac{4}{3}(u_{refx} - 1), & 2 \le u_{refx} \le 4 \end{cases}$$

$$u_{refx4} = \begin{cases} 0, & 0 \le u_{refx} \le 2 \\ 2(u_{refx} - 2), & 2 \le u_{refx} \le 4 \end{cases}$$

When $u_{refx}$ is a symmetric and sinusoidal waveform, based on the formula (9), the reference voltages, the control signal of each switch and the output phase voltage may be drawn, as shown in FIG. 9. FIG. 9 is a schematic diagram illustrating single carrier based five-level modulation according to an embodiment of the present disclosure, as can be seen from FIG. 9, the output phase voltage waveform has five levels.

Figure 10:
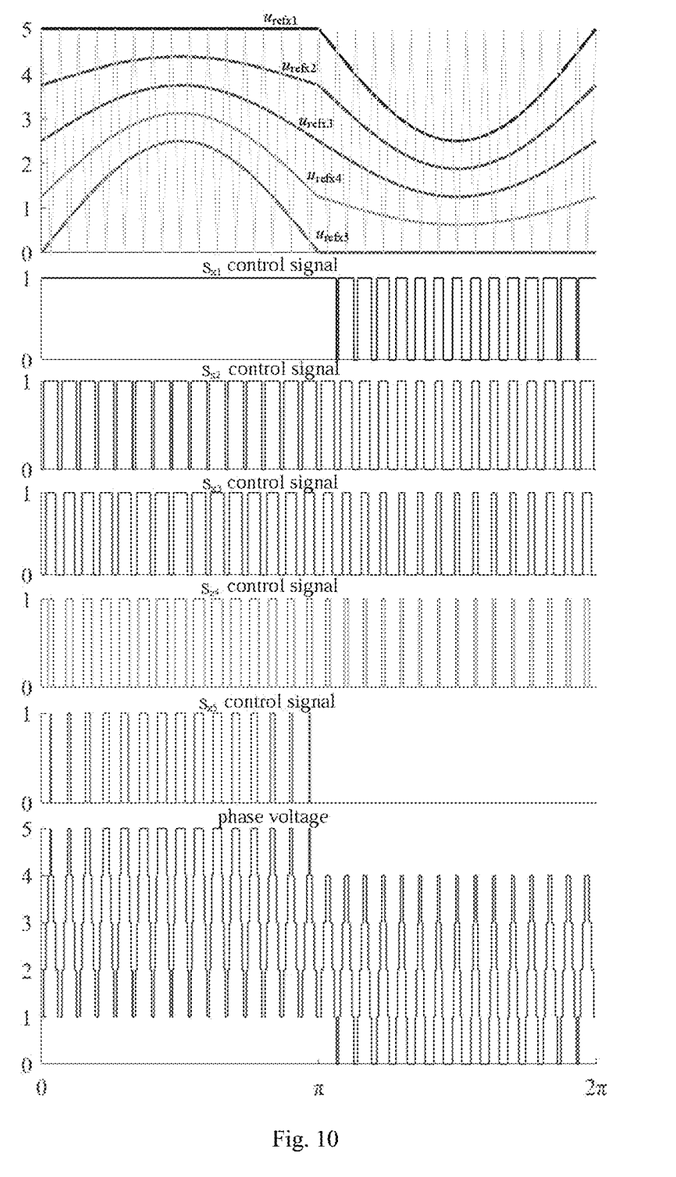
FIG. 10 is a schematic diagram illustrating single carrier based six-level modulation according to an embodiment of the present disclosure.

For NPC six-level converters, n=5, by substituting 5 into formulas (2) and (4), it can be obtained that:

$$u_{refx1} = \begin{cases} 2u_{refx}, & 0 \le u_{refx} \le 2.5 \\ 5,, & 2.5 \le u_{refx} \le 5 \end{cases} \quad (10)$$

$$u_{refx2} = \begin{cases} \frac{3}{2}u_{refx}, & 0 \le u_{refx} \le 2.5 \\ \frac{1}{2}(u_{refx} + 5), & 2.5 \le u_{refx} \le 5 \end{cases}$$

$$u_{refx3} = \begin{cases} u_{refx}, & 0 \le u_{refx} \le 2.5 \\ u_{refx}, & 2.5 \le u_{refx} \le 5 \end{cases}$$

$$u_{refx4} = \begin{cases} \frac{1}{2}u_{refx}, & 0 \le u_{refx} \le 2.5 \\ \frac{3}{2}u_{refx} - \frac{5}{2}, & 2.5 \le u_{refx} \le 5 \end{cases}$$

$$u_{refx5} = \begin{cases} 0, & 0 \le u_{refx} \le 2.5 \\ 2u_{refx} - 5, & 2.5 \le u_{refx} \le 5 \end{cases}$$

When $u_{refx}$ is a symmetric and sinusoidal waveform, based on the formula (10), the reference voltages, the control signal of each switch and the output phase voltage may be drawn, as shown in FIG. 10. FIG. 10 is a schematic diagram illustrating single carrier based six-level modulation according to an embodiment of the present disclosure, as can be seen from FIG. 10, the output phase voltage waveform has six levels.

Figure 11:
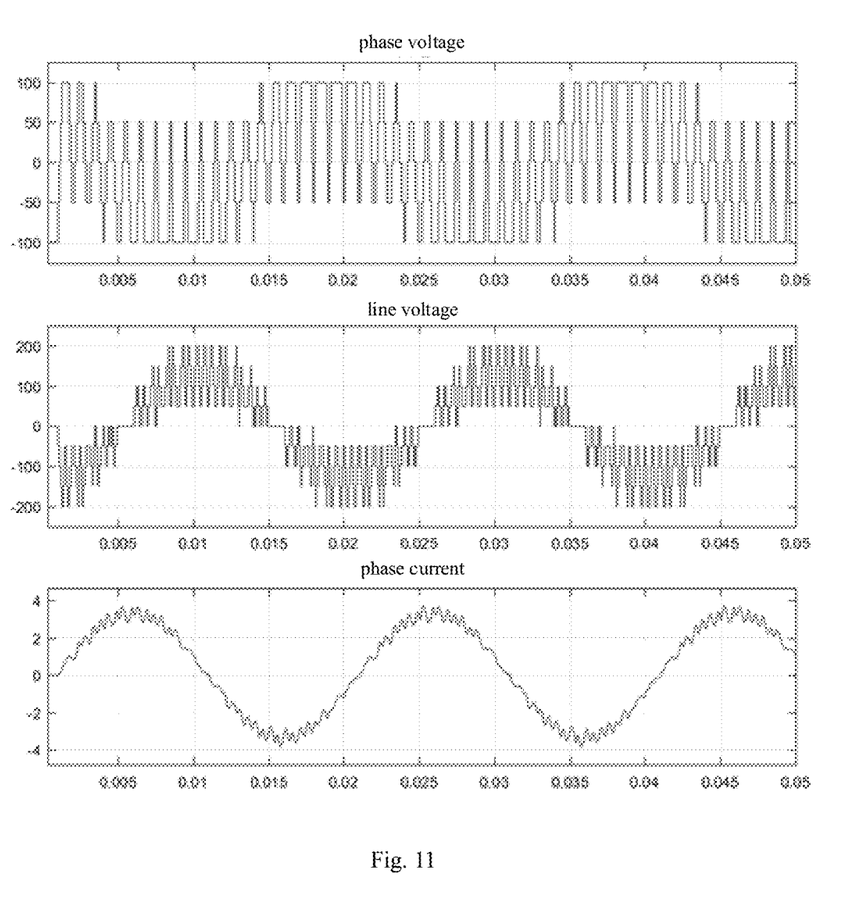
FIG. 11 is a schematic diagram illustrating a simulation result of phase voltages, line voltages and phase currents of a diode-clamped five-level converter by a single carrier based multilevel modulation method according to an embodiment of the present disclosure.
Figure 12:
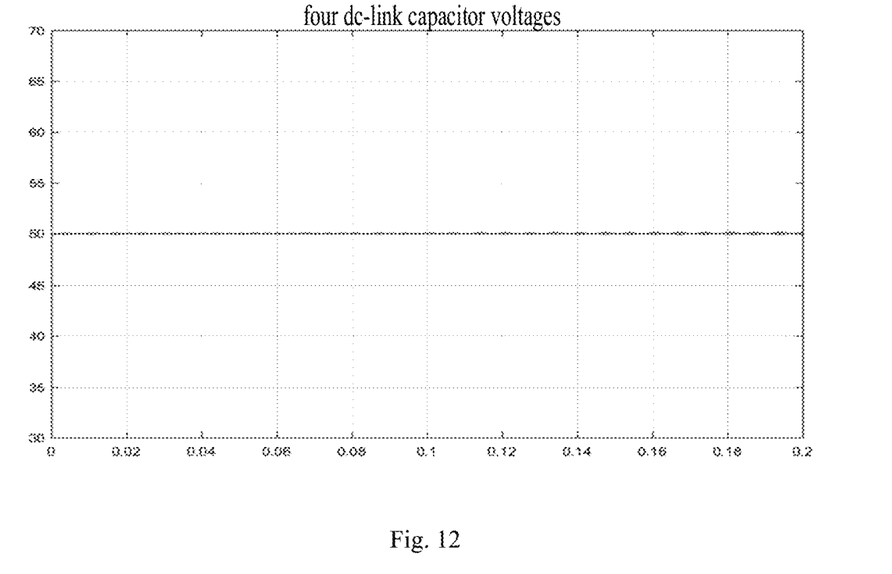
FIG. 12 is a schematic diagram illustrating a simulation result of four dc-link capacitor voltages of a diode-clamped five-level converter by a single carrier based multilevel modulation method according to an embodiment of the present disclosure.

To demonstrate the validity of the modulation method of an embodiment of the present disclosure, the simulation and experimental results on a five-level NPC converter are provided. The parameters used for simulation includes follows. The DC-link voltage is 200V, the DC-link capacitor capacity $C_d$ is 1000 μF, the carrier frequency is 1 kHz, the modulation ratio is 0.75, the load resistance is 22Ω, and inductance L is 10 mH.

FIG. 11 is a schematic diagram illustrating a simulation result of phase voltages, line voltages and phase currents of a diode-clamped five-level converter by a single carrier based multilevel modulation method according to an embodiment of the present disclosure. As shown in FIG. 11, the phase voltage has five levels, and the line voltage has nine levels. FIG. 12 is a schematic diagram illustrating a simulation result of four dc-link capacitor voltages of a diode-clamped five-level converter by a single carrier based multilevel modulation method according to an embodiment of the present disclosure. As shown in FIG. 12, all the four DC-link capacitor voltages are balanced under a steady-state condition.

It should be noted that, the single carrier based multilevel modulation method according to embodiments of the present disclosure may also be applicable to converters with different types of topologies, such as diode-clamped, active NPC, T-type NPC, etc.

With the multilevel modulation method according to the embodiments of the present disclosure, a carrier and multiple modulated waves are adopted, and each switch pair corresponds to a modulated wave, which can avoid a large number of mathematical operations and complicated programming required by space vector PWM. Moreover, the average of all neutral point currents is zero in a fundamental period, such that the capacitor voltage balance of the NPC multilevel converter can be achieved, and the calculation amount can be reduced.

A single carrier based multilevel modulation device according to an embodiment of the present disclosure will be described below with reference to the accompanying drawings.

Figure 13:
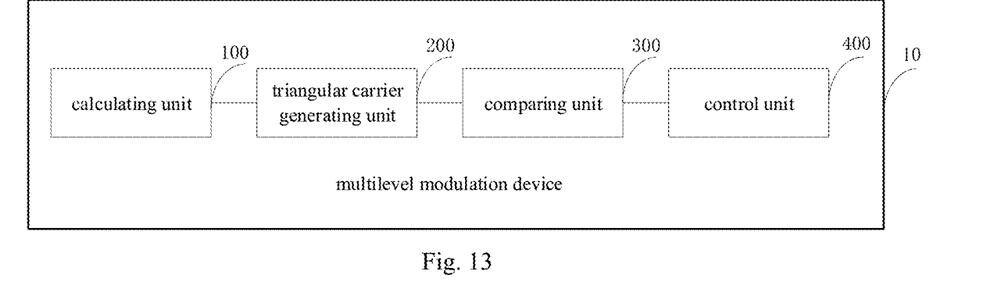
FIG. 13 is a block diagram of a single carrier based multilevel modulation device according to an embodiment of the present disclosure.

FIG. 13 is a block diagram of a single carrier based multilevel modulation device 10 according to an embodiment of the present disclosure. As shown in FIG. 13, the device 10 includes a calculating unit 100, a triangular carrier generating unit 200, a comparing unit 300, and a control unit 400.

The calculating unit 100 is configured to, in each control period, obtain a modulated wave value corresponding to each of n switch pairs according to a reference voltage to obtain n modulated wave values, where n is a positive integer. The triangular carrier generating unit 200 is configured to generate a triangular carrier having an amplitude of n. The comparing unit 300 is configured to compare the triangular carrier with each of the n modulated wave values, to obtain control signals for each of the n switch pairs. The control signals include a first control signal and a second control signal, and the first control signal and the second control signal are complementary. The control unit 400 is configured to, for each phase, input the first control signal to the first switch of a phase bridge, and input the second control signal to the second switch of the phase bridge. Each phase bridge includes n switch pairs.

In an embodiment, the $k^{th}$ modulated wave value $u_{refxk}$ for a $k^{th}$ switch pair $S_{xk}$ and $S_{xk}'$ includes:

$$\text{when } 0 \le u_{refx} \le n/2, \quad u_{refxk} = \frac{2(n-k)}{n-1}u_{refx};$$

$$\text{when } n/2 \le u_{refx} \le n, \quad u_{refxk} = n - \frac{2(k-1)}{n-1}(n - u_{refx});$$

where $u_{refx}$ denotes the reference voltage, k denotes a switch serial number, and k is a positive integer, 1≤k≤n.

In an embodiment, when the modulated wave value is greater than the triangular carrier, the first control signal corresponding to the first switch is a high level, and the second control signal corresponding to the second switch is a low level. When the modulated wave value is less than or equal to the triangular carrier, the first control signal corresponding to the first switch is a low level, and the second control signal corresponding to the second switch is a high level.

In an embodiment, an average of output phase voltage in a carrier period equals to the reference voltage.

When $0 \leq u_{refx} \leq n/2$, $$u_{ox} = \sum_{k=1}^{n} d_{xk} = \sum_{k=1}^{n} \frac{2(n-k)}{n(n-1)} u_{refx} = \frac{2u_{refx}}{n(n-1)} \cdot \frac{n(n-1)}{2} = u_{refx}.$$

When $n/2 \leq u_{refx} \leq n$, $u_{ox} = \sum_{k=1}^{n} d_{xk} = \sum_{k=1}^{n} 1 - \frac{2(k-1)}{n(n-1)}(n - u_{refx}) = u_{refx}.$ where $u_{ox}$ denotes the average of the output phase voltage in the carrier period, $d_{xk}$ denotes a duty ratio of a control signal of the switch $S_{xk}$ in the carrier period, and $$d_{xk} = \frac{u_{refxk}}{n}.$$

In an embodiment, an average of all neutral point currents is zero in a fundamental period.

It should be noted that, the foregoing explanation of the embodiments of the method may also be applicable to the device of the embodiment, and details are not described herein again.

With the multilevel modulation device according to the embodiments of the present disclosure, a carrier and multiple modulated waves are adopted, and each switch pair corresponds to a modulated wave, which can avoid a large number of mathematical operations and complicated programming required by space vector PWM. Moreover, the average of all neutral point currents is zero in a fundamental period, such that the capacitor voltage balance of the NPC multilevel converter can be achieved, and the calculation amount can be reduced.

Figure 14:
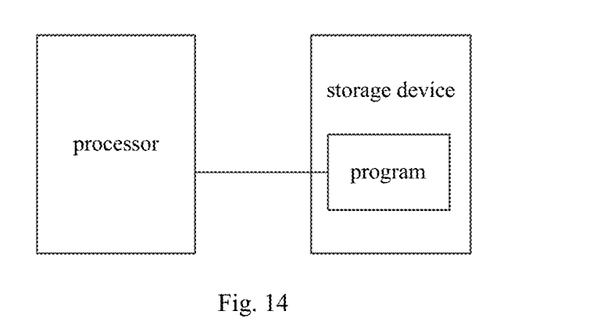
FIG. 14 is a block diagram of a single carrier based multilevel modulation device according to an embodiment of the present disclosure.

FIG. 14 is a block diagram of a single carrier based multilevel modulation device according to an embodiment of the present disclosure. As shown in FIG. 14, the single carrier based multilevel modulation device includes one or more processors and a storage device. The storage device is configured to store one or more programs.

When the one or more programs are executed by the one or more processors, the one or more processors are caused to implement a single carrier based multilevel modulation method according to embodiments of the present disclosure to be implemented.

Embodiments of the present disclosure further provides a non-transitory computer storage medium having stored thereon a computer program that, when executed by a processor, causes a single carrier based multilevel modulation method according to embodiments of the present disclosure to be implemented.

In the description, it is to be understood that, terms such as "first" and "second" are used herein for purposes of description and are not intended to indicate or imply relative importance or significance. In the description of the present disclosure, it is to be illustrated that, unless specified or limited otherwise, terms "interconnected," and "connected," are understood broadly, such as fixed, detached or integral interconnections and connections, also can be mechanical or electrical interconnections and connections, further can be direct interconnections and connections and indirect interconnections and connections via intermediate medium. For those skilled in the art, it can be understood the concrete meaning of the terms mentioned above in the present disclosure according to specific circumstances. Furthermore, in the description of the present disclosure, unless illustrated otherwise, "a plurality of" means two or more than two.

Any procedure or method described in the flow charts or described in any other way herein may be understood to include one or more modules, portions or parts for storing executable codes that realize particular logic functions or procedures. Moreover, advantageous embodiments of the present disclosure include other implementations in which the order of execution is different from that which is depicted or discussed, including executing functions in a substantially simultaneous manner or in an opposite order according to the related functions. These and other aspects should be understood by those skilled in the art with reference to the following description and drawings. In these description and drawings, some particular implementations of the present disclosure are disclosed to present some ways for implementing the principle of the present disclosure. However, it should be understood that embodiments of the present disclosure are not limited to this. Contrarily, embodiments of the present disclosure include all the variations, modifications and equivalents within the spirit and scope of the appended claims.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium. The storage medium mentioned above may be read-only memories, magnetic disks or CD, etc.

In the description, terms such as "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the above terms in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A single carrier based multilevel modulation method, comprising:
in each control period, obtaining a modulated wave value corresponding to each of n switch pairs according to a reference voltage to obtain n modulated wave values, wherein each of the n switch pairs comprises a first switch and a second switch, the first switch and the second switch are complementary, n is a positive integer;
generating a triangular carrier having an amplitude of n, and comparing the triangular carrier with each of the n modulated wave values to obtain control signals for each of the n switch pairs, wherein the control signals comprise a first control signal and a second control signal, and the first control signal and the second control signal are complementary;
for each phase, inputting the first control signal to the first switch of a phase bridge, and inputting the second control signal to the second switch of the phase bridge, wherein the phase bridge comprises n switch pairs;

wherein a $k^{th}$ modulated wave value $u_{refxk}$ for a $k^{th}$ switch pair $S_{xk}$ and $S_{xk}'$ comprises:

$$\text{when } 0 \leq u_{refx} \leq n/2, \quad u_{refxk} = \frac{2(n-k)}{n-1}u_{refx};$$

$$\text{when } n/2 \leq u_{refx} \leq n, \quad u_{refxk} = n - \frac{2(k-1)}{n-1}(n - u_{refx});$$

where $u_{refx}$ denotes the reference voltage, k denotes a switch serial number, and k is a positive integer, $1 \leq k \leq n$.

2. The single carrier based multilevel modulation method according to claim 1, wherein,
when the modulated wave value is greater than the triangular carrier, the first control signal corresponding to the first switch is a high level, and the second control signal corresponding to the second switch is a low level;
when the modulated wave value is less than or equal to the triangular carrier, the first control signal corresponding to the first switch is a low level, and the second control signal corresponding to the second switch is a high level.

3. The single carrier based multilevel modulation method according to claim 1, wherein an average of output phase voltage in a carrier period equals to the reference voltage;

$$\text{when } 0 \leq u_{refx} \leq n/2,$$

$$u_{ox} = \sum_{k=1}^{n} d_{xk} = \sum_{k=1}^{n} \frac{2(n-k)}{n(n-1)} u_{refx} = \frac{2u_{refx}}{n(n-1)} \cdot \frac{n(n-1)}{2} = u_{refx};$$

$$\text{when } n/2 \leq u_{refx} \leq n, \quad u_{ox} = \sum_{k=1}^{n} d_{xk} = \sum_{k=1}^{n} 1 - \frac{2(k-1)}{n(n-1)}(n - u_{refx}) = u_{refx};$$

where $u_{ox}$ denotes the average of the output phase voltage in the carrier period, $d_{xk}$ denotes a duty ratio of a control signal of the switch $S_{xk}$ in the carrier period, and $$d_{xk} = \frac{u_{refxk}}{n}.$$

4. The single carrier based multilevel modulation method according to claim 1, wherein an average of all neutral point currents is zero in a fundamental period.

5. A single carrier based multilevel modulation device, comprising:
one or more processors;
a storage device, configured to store one or more programs,
wherein when the one or more programs are executed by the one or more processors, the one or more processors are caused to:
in each control period, obtain a modulated wave value corresponding to each of n switch pairs according to a reference voltage to obtain n modulated wave values, wherein each of the n switch pairs comprises a first switch and a second switch, the first switch and the second switch are complementary, n is a positive integer;
generate a triangular carrier having an amplitude of n, and compare the triangular carrier with each of the n modulated wave values to obtain control signals for each of the n switch pairs, wherein the control signals comprise a first control signal and a second control signal, and the first control signal and the second control signal are complementary;

for each phase, input the first control signal to the first switch of a phase bridge, and input the second control signal to the second switch of the phase bridge, wherein the phase bridge comprises n switch pairs;

wherein a $k^{th}$ modulated wave value $u_{refxk}$ for a $k^{th}$ switch pair $S_{xk}$ and $S_{xk}'$ comprises:

$$\text{when } 0 \leq u_{refx} \leq n/2, \ u_{refxk} = \frac{2(n-k)}{n-1} u_{refx};$$

$$\text{when } n/2 \leq u_{refx} \leq n, \ u_{refxk} = n - \frac{2(k-1)}{n-1}(n - u_{refx});$$

where $u_{refx}$ denotes the reference voltage, k denotes a switch serial number, and k is a positive integer, 1≤k≤n.

6. The single carrier based multilevel modulation method according to claim 5, wherein, when the modulated wave value is greater than the triangular carrier, the first control signal corresponding to the first switch is a high level, and the second control signal corresponding to the second switch is a low level;

when the modulated wave value is less than or equal to the triangular carrier, the first control signal corresponding to the first switch is a low level, and the second control signal corresponding to the second switch is a high level.

7. The single carrier based multilevel modulation device according to claim 5, wherein an average of output phase voltage in a carrier period equals to the reference voltage;

when $0 \leq u_{refx} \leq n/2$, $$u_{ox} = \sum_{k=1}^{n} d_{xk} = \sum_{k=1}^{n} \frac{2(n-k)}{n(n-1)} u_{refx} = \frac{2u_{refx}}{n(n-1)} \cdot \frac{n(n-1)}{2} = u_{refx};$$

when $n/2 \leq u_{refx} \leq n$, $u_{ox} = \sum_{k=1}^{n} d_{xk} = \sum_{k=1}^{n} 1 - \frac{2(k-1)}{n(n-1)}(n - u_{refx}) = u_{refx};$ where $u_{ox}$ denotes the average of the output phase voltage in the carrier period, $d_{xk}$ denotes a duty ratio of a control signal of the switch $S_{xk}$ in the carrier period, and $$d_{xk} = \frac{u_{refxk}}{n}.$$

8. The single carrier based multilevel modulation device according to claim 5, wherein an average of all neutral point currents is zero in a fundamental period.

9. A non-transitory computer storage medium having stored thereon a computer program that, when executed by a processor, causes a single carrier based multilevel modulation method to be implemented, the method comprising:

in each control period, obtaining a modulated wave value corresponding to each of n switch pairs according to a reference voltage to obtain n modulated wave values, wherein each of the n switch pairs comprises a first switch and a second switch, the first switch and the second switch are complementary, n is a positive integer;

generating a triangular carrier having an amplitude of n, and comparing the triangular carrier with each of the n modulated wave values to obtain control signals for each of the n switch pairs, wherein the control signals comprise a first control signal and a second control signal, and the first control signal and the second control signal are complementary;

for each phase, inputting the first control signal to the first switch of a phase bridge, and inputting the second control signal to the second switch of the phase bridge, wherein the phase bridge comprises n switch pairs;

wherein a $k^{th}$ modulated wave value $u_{refxk}$ for a $k^{th}$ switch pair $S_{xk}$ and $S_{xk}'$ comprises:

$$\text{when } 0 \leq u_{refx} \leq n/2, \ u_{refxk} = \frac{2(n-k)}{n-1} u_{refx};$$

$$\text{when } n/2 \leq u_{refx} \leq n, \ u_{refxk} = n - \frac{2(k-1)}{n-1}(n - u_{refx});$$

where $u_{refx}$ denotes the reference voltage, k denotes a switch serial number, and k is a positive integer, 1≤k≤n.

10. The non-transitory computer storage medium according to claim 9, wherein, when the modulated wave value is greater than the triangular carrier, the first control signal corresponding to the first switch is a high level, and the second control signal corresponding to the second switch is a low level;

when the modulated wave value is less than or equal to the triangular carrier, the first control signal corresponding to the first switch is a low level, and the second control signal corresponding to the second switch is a high level.

11. The non-transitory computer storage medium according to claim 9, wherein an average of output phase voltage in a carrier period equals to the reference voltage;

when $0 \leq u_{refx} \leq n/2$, $u_{ox} =$ $$\sum_{k=1}^{n} d_{xk} = \sum_{k=1}^{n} \frac{2(n-k)}{n(n-1)} u_{refx} = \frac{2u_{refx}}{n(n-1)} \cdot \frac{n(n-1)}{2} = u_{refx};$$

when $n/2 \leq u_{refx} \leq n$, $u_{ox} = \sum_{k=1}^{n} d_{xk} = \sum_{k=1}^{n} 1 - \frac{2(k-1)}{n(n-1)}(n - u_{refx}) = u_{refx};$ where $u_{ox}$ denotes the average of the output phase voltage in the carrier period, $d_{xk}$ denotes a duty ratio of a control signal of the switch $S_{xk}$ in the carrier period, and $$d_{xk} = \frac{u_{refxk}}{n}.$$

12. The non-transitory computer storage medium according to claim 9, wherein an average of all neutral point currents is zero in a fundamental period.

* * * * *